Figure 1:
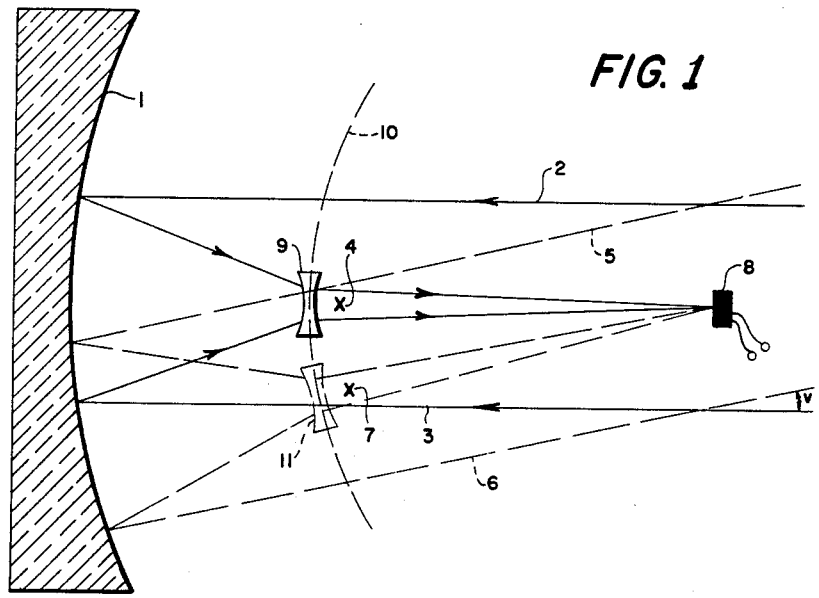

Sept. 14, 1965  E. AULIN  3,206,608
OPTICAL SCANNING DEVICE
Filed Sept. 14, 1960

INVENTOR
EVERT AULIN
BY Larson and Taylor
ATTORNEYS

United States Patent Office 3,206,608
Patented Sept. 14, 1965

3,206,608
OPTICAL SCANNING DEVICE
Evert Aulin, Lidingo, Sweden, assignor to Svenska Aktiebolaget Gasaccumulator, Lidingo, Sweden, a corporation of Sweden
Filed Sept. 14, 1960, Ser. No. 55,993
Claims priority, application Sweden, Oct. 23, 1959,
9,880/59
1 Claim. (Cl. 250—235)

The present invention relates to a device which is adapted for scanning a certain angular area for detecting objects which transmit or retransmit electromagnetic radiation within such a range of wavelengths that normal optical elements such as mirrors and lenses can be utilized for reflecting or refracting the incoming radiation. The device is preferably constructed so as to detect the infrared radiation emitted from objects of higher temperature than the surroundings, such as an engine.

Devices of this kind can be constructed to make parallel rays from an object at a large distance be collected by means of a spherical mirror on a detector which is sensitive to the wavelength of the incoming radiation. To enable the scanning of a certain angular area with such a device, it is necessary, either to make the whole system comprising the mirror and the detector perform an oscillation within this angular area, or, if the mirror is made stationary, to make the detector perform a corresponding oscillation. Both these systems have certain disadvantages. For example, in a device of the first-mentioned type, the total mass of the oscillating system will be comparatively large, which entails difficulties of a mechanical nature. In the last-mentioned case, where the detector performs an oscillation, difficulties arise from the fact that the detector must be provided with flexible connections, which must furthermore be effectively screened, since the detector output signal is at a very low level. However, this leads to uncontrollable variations in the capacitance of the connections. Also, the movable connections make the device less dependable in operation.

Through the application of the present invention, these drawbacks are obviated from the fact that the mirror as well as the detector can be made stationary. Therefore, no large-mass elements have to perform an oscillation, and at the same time, no movable connections to the detector are required. In accordance with the invention there is arranged between the reflector and the detector a radiation-diverging element of such a negative refractive strength as to collect incoming parallel rays in the centre of curvature of the reflector, the detector being placed in this centre of curvature. The diverging element referred to is made to perform an oscillation along a circular path concentric with the reflector in such a way that the optical axis of the element passes continually through the centre of curvature of the reflector. In this manner, the desired scanning of the given angular area is achieved at the same time as only the diverging element has to be movable.

Figure 2:
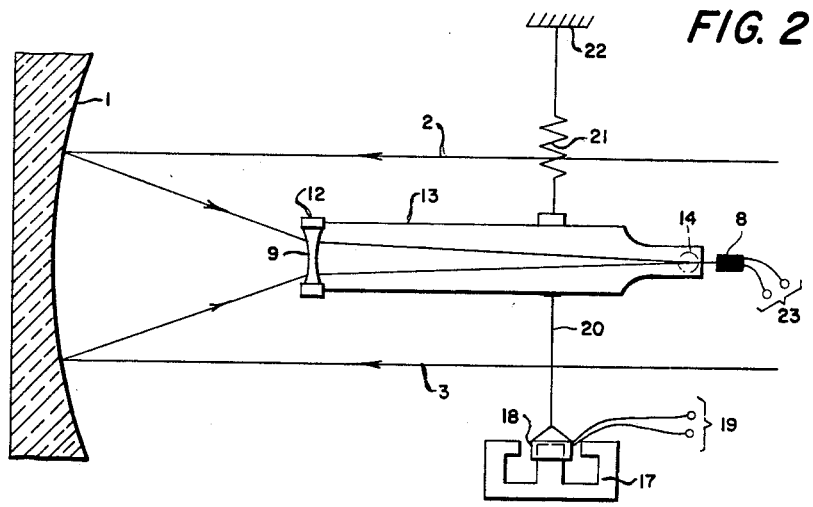
Figure 3:
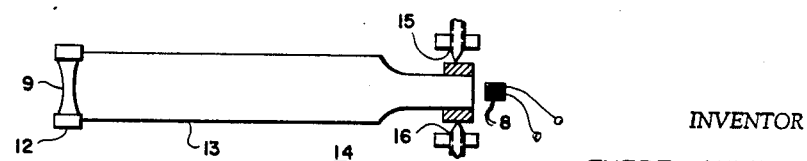

The invention will be described below with reference to the attached drawing, FIG. 1 of which shows a sketch illustrating the principle of the device. FIG. 2 shows an embodiment of the invention and FIG. 3 a detail of the device according to FIG. 2 in another projection.

In FIG. 1 of the attached drawing, 1 designates the reflector, which is provided with a spherical reflecting surface. This means that incoming parallel rays, such as the rays 2 and 3 indicated in the drawing, are collected in a point 4, provided that no further optical elements are inserted in the path of the rays. If rays arrive from another direction, such as the rays 5 and 6, which are shown on the drawing in dash lines, they are collected in a point 7. In well known manner, the points 4 and 7 are situated on a surface which is concentric to the reflecting surface 1. It is apparent from the figure that the detector must be made to perform an oscillation with an amplitude at least equal to the distance between the points 4 and 7, if the device is constructed in the manner referred to above with an oscillating detector and it is desired to scan an angular area comprising 2$v$.

In the device according to the invention, the detector 8 is placed in the centre of curvature of the mirror 1 and a radiation-diverging element 9 is placed between the mirror 1 and the detector 8. This element 9 has sufficient negative refractive strength to collect incoming parallel rays in the centre of curvature of the mirror 1, where the detector 8 is placed. If now the diverging element 9 is made to oscillate on a circular path 10, which is concentric to the reflecting surface 1, the result is that the system performs scanning of the angular area 2$v$.

The amplitude of the diverging element 9, which is preferably symmetrical, is chosen in such a way that at one of the terminal positions 11 the incoming parallel rays 5, 6 are collected at the detector 8. The detector preferably comprises a photo tube, which is sensitive to the incoming radiation, such as infra-red. Owing to the fact that the detector 8 is stationary, it is possible to connect it direct to a suitable amplifier, whereby the output signal will be at a sufficiently high level with regard to noise. In addition, the detector should have a small surface in order to provide a favourable signal-to-noise ratio.

The arrangement for making the diverging element 9 perform the desired oscillation can be constructed in any desired manner with the aid of already known technical devices. A possible form of such a construction is indicated in FIG. 2, in which the rays 2 and 3 are collected by the mirror 1 and the diverging element 10 to the detector 8 similarly to the foregoing disclosure. In this embodiment of the invention, the diverging element 9 is mounted by means of a support 12 in the end of a tube 13. The tube 13 is supported at the far end thereof with respect to the element 9 by a bearing 14, which is indicated in FIG. 2 and is shown in more detail in FIG. 3. In the present instance, it is assumed that the element 9 is to oscillate in a plane coinciding with the circular path 10 shown in FIG. 1. The bearing 14 may therefore consist simply of a pair of points 15 and 16 in contact with mutually diametrically opposite points of the tube 13. It is suitable to provide a reinforcement of the tube 13 at these points. The tube 13 can furthermore be tapered toward this end, as indicated on the drawing. If the element 9 is to perform an oscillation in two mutually perpendicular directions, the bearing 14 may be constructed in a known manner as a gimbal mounting, i.e. with an inner and an outer gimbal ring and with mutually perpendicular axles for joining the rings.

To set up the oscillatory movement, there is provided in the device according to FIG. 2 an electromagnetic element comprising a magnetic core 17 cooperating with a coil 18, which is supplied with alternating current of suitable frequency and amplitude through terminals 19. The coil 18 can be attached by means of a rod 20 to the tube 13, the tube being furthermore subjected to the influence of a tension spring 21, which is attached between the tube and a fixed structure 22. Upon the application of alternating current to the coil 18 through the terminals 19, the element 9 is thus made to perform the desired oscillation and scanning of the desired angular area takes place, whereby a voltage is generated in the detector 8. This voltage can be taken off at the terminals 23, possibly after some amplification provided in the detector.

What is claimed is:

A scanning device for detecting electromagnetic radiation comprising a spherical reflector, a detector for reflected radiation mounted at the center of curvature of said reflector, a radiation diverging element between said reflector and said detector, means pivotally mounted between said reflector and detector for carrying said diverging element along an arcuate path concentric with the center of curvature of said reflector, a spring having one end fixed and the other end connected to said carrying means, a coil mounted on said carrying means, and a magnetic core operatively positioned with respect to said coil so that energization of said core and coil will oscillate said diverging element along its arcuate path, said radiation diverging element having its optical axis passing continually through said center of curvature so that reflected radiation passes through said diverging element to be collected at said detector.

References Cited by the Examiner

UNITED STATES PATENTS

| | | | |
|---|---|---|---|
| 1,896,830 | 2/33 | Scharff | 250—237 |
| 2,769,374 | 11/56 | Sick | 250—230 |
| 2,817,995 | 12/57 | Kirkham | 88—14 |
| 2,924,656 | 2/60 | Schagen et al. | 88—1 |
| 2,931,913 | 4/60 | Long | 250—237 |
| 2,958,802 | 11/60 | Hammer et al. | 250—83.3 |
| 2,966,591 | 12/60 | McCartney | 250—203 |
| 2,975,419 | 3/61 | Brown | 88—57 |
| 2,989,643 | 6/61 | Scanlon | 250—230 |
| 3,004,162 | 10/61 | Menke | 250—83.3 |
| 3,010,019 | 11/61 | Sohst | 250—83.3 |
| 3,054,899 | 9/62 | McKnight et al. | 250—83.3 |

FOREIGN PATENTS 1,036,648  4/53  France.

RALPH G. NILSON, *Primary Examiner.*

RICHARD M. WOOD, *Examiner.*